Aug. 14, 1945.   C. D. MASON   2,382,248
COMPOSITE RUBBER AND FIBROUS MATERIAL AND METHOD OF MAKING SAME
Filed Sept. 11, 1942

Inventor
Claude D. Mason
By Eugene M. Giles
Atty.

Patented Aug. 14, 1945

2,382,248

UNITED STATES PATENT OFFICE 2,382,248

COMPOSITE RUBBER AND FIBROUS MATERIAL AND METHOD OF MAKING SAME

Claude Dodds Mason, Mishawaka, Ind., assignor to Mishawaka Rubber and Woolen Manufacturing Company, Mishawaka, Ind., a corporation of Indiana Application September 11, 1942, Serial No. 457,948

2 Claims. (Cl. 260—748)

The present invention relates to composite thermoplastic materials in sheet or slab form. More specifically, it resides in a material comprising principally a rubber compound in which is distributively incorporated a profusion of leather or other fibrous scraps or pieces which are of substantial body and extent. The material is preferably produced in sheet or slab form and is particularly suitable as stock for the soles and heels of boots and shoes. The invention also embraces a method for the production and fabrication of this material or stock.

It has been proposed heretofore to employ pulverized leather or leather and other fibrous substances in the form of shredded fibers in intimate admixture with rubber compounds as filling, loading or adulterant agents. These products, however, comprise homogeneous mixtures wherein the characteristic properties and advantages of leather as shoe soling material are completely lost, the products exhibiting, primarily, merely the properties of rubber or, rather, of loaded rubber compounds such as those loaded with carbon or various inorganic fillers.

Now a prime object of the present invention is to provide a composite material, as distinguished from a loaded or adulterated material, composed of a rubber compound and leather or similar fibrous substances and which has substantially all of the properties of rubber and yet retains most of the characteristic advantages of leather as shoe soling material.

Another object is to provide a novel shoe sole and heel stock which possesses a combination of the characteristics and advantages of both rubber and leather.

Another object is to provide shoe soles and heels having the known advantages of rubber, such as softness, resilience, flexibility and the like, and which have at the surface isolated but substantial areas of leather or the like which contribute to the material the features of leather, such as wear resistance, non-slip properties under conditions of dampness, and other properties characteristic of leather soling material.

A further object of the invention is to provide a shoe sole and heel stock combining the properties of rubber and leather which is economically producible, of attractive appearance, of good wearing quality, and possesses other desirable features and advantages which will be apparent to those skilled in the art.

It is also an object of the invention to provide, in a modification thereof, a composite material of rubber and fibrous substances which has a pebbled and wrinkled surface simulative of a crepe rubber surface.

A still further object of the invention is to provide a simple, convenient and economically advantageous method for the production and fabrication of the composite material hereof.

With these and other objects in view the invention comprises the novel product and manner of producing the same hereinafter fully described, illustrated in the accompanying drawing, and particularly pointed out in the appended claims, it being understood that the invention is not to be limited to the precise embodiment herein set forth, but that various changes in the size, proportions, and minor details, and manners of effecting same, may be made, within the scope of the claims, without departing from the spirit of the invention or sacrificing any of the advantages thereof.

In the drawing:

Fig. 3 is a fragmentary plan view of a stock embodying features of the invention but wherein the leather or fibrous scraps are not exposed at the surface of the material, as in the shoe sole of Fig. 1.

Fig. 4 is a cross-sectional view of the stock of Fig. 3 taken on the line 4—4 of said figure.

Generally speaking, the composite material or stock hereof comprises a rubber compound throughout which has been distributively incorporated in random fashion a profusion of leather pieces or scraps of substantial body and extent. The leather scraps generally range anywhere from approximately ⅛ inch up to an inch or more in length. In the preferred manner of producing this material, as will be explained in detail hereinafter, leather scraps are first milled together with a small amount of rubber to form what is known as a master batch, which is thereafter combined in a mixing mill with additional rubber and customary rubber compounding agents. The resulting product may be sheeted out and vulcanized in sheet or slab form to produce the ultimate composite rubber and leather scrap material of the invention. When used as shoe soling materal at least the outer or bottom surface of the blanked sole is buffed or otherwise ground or abraded to expose areas of the leather scraps at the surface, thus providing a shoe sole the surface of which partakes of the hereinbefore enumerated characteristics of leather, but which retains the advantages and desirabilities of rubber.

Figure 1:
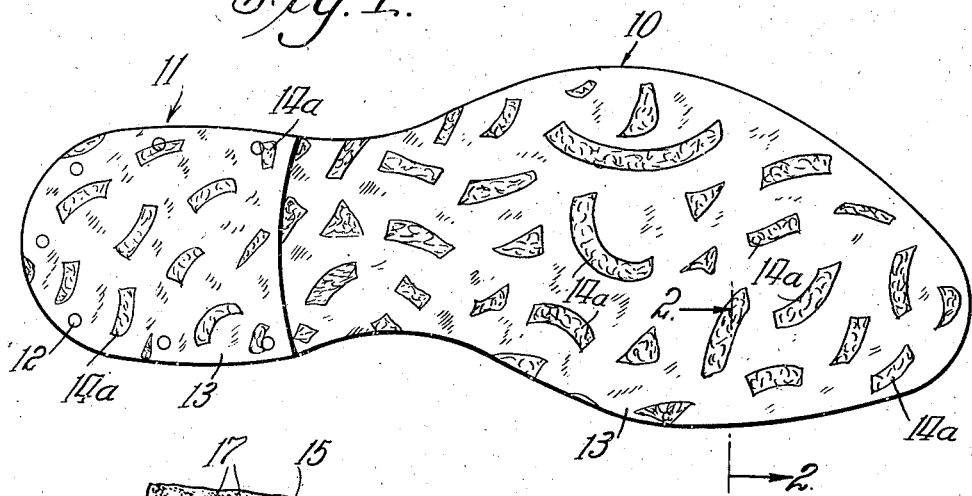
Fig. 1 is a bottom plan view of a sole and heel assembly of a shoe, the sole and heel being formed of a stock embodying features of the present invention.

In Fig. 1 of the drawing there is shown a shoe sole and heel assembly, the sole and heel being fabricated of the composite rubber and leather scrap material or stock of the present invention. The reference numeral 10 indicates generally an outsole formed of the novel stock hereof, while the numeral 11 indicates generally a heel formed of the same material and which may have been attached to the heel portion of the outsole by appropriate fastening means 12, in a manner well known in the art. The principal portion of this material comprises a body or matrix 13 of vulcanized rubber. In addition to the ordinary rubber compounding agents such as sulphur, accelerators, activators and the like, the rubber matrix 13 may or may not contain inert loading materials such as carbon or inorganic fillers, as desired, and may also contain pigments or coloring agents. In other words, the rubber matrix 13 may comprise any rubber compound customarily employed as shoe sole and heel stock.

Distributively incorporated throughout the rubber matrix 13 is a profusion of pieces or scraps 14a and 14b of leather or other similar fibrous material. A primary purpose of the invention is to have substantial areas of leather, as exemplified by the scraps 14a, exposed at the ground engaging surface of the shoe sole and heel, for the purpose of imparting to the rubber sole and heel characteristic properties of leather, such as wear resistance, slip resistance under conditions of dampness, and the like. For economy in manufacture, however, as will hereinafter fully appear, it is convenient to distribute the leather scraps throughout the entire body or matrix 13 of the rubber compound. Thus the leather scraps will appear throughout the entire body of the rubber as indicated by the reference numeral 14b in Fig. 2. This is not objectionable however and contributes factors of strength throughout the composite material and assures that areas of the leather component will always be exposed as the stock wears thinner.

It will be understood, therefore, that the material or article of the present invention, in its preferred form, comprises a composite body formed of a matrix of vulcanized rubber throughout which is distributively incorporated a profusion of leather or other fibrous pieces of substantial extent. In this preferred form of the invention numerous of the leather pieces or scraps are exposed on at least one surface of the material, so that that surface partakes of some of the characteristics and advantages of a leather surface, while still retaining at the surface, as well as throughout the mass of the material, the characteristic features and properties of vulcanized rubber. The exposure of the leather pieces at the surface of the material is preferably accomplished by grinding or buffing of the said surface so that not only is the rubber removed from the surface of the leather particles but the particles themselves are somewhat roughened to present a non-skid relatively rough leather surface at scattered intervals throughout the face of the material. Such a material provides an excellent shoe sole which possesses the flexibility, softness and quietness inherent in rubber soling material while also possessing scattered areas of leather which afford the good wearing qualities and the non-skid properties inherent in leather soling material. Thus the advantages of each type of soling material are combined and realized in the one composite material of the present invention.

On the other hand, it has been observed that the composite rubber and leather material hereof, in a form slightly modified from that just described, possesses other desirable features and characteristics. Such slight modification is shown in the fragmentary views of Figs. 3 and 4. These figures show plan and cross sectional views, respectively, of a composite rubber and leather material in all respects identical with that hereinbefore described except that in the present modification the leather pieces are not exposed at the surface of the material, whereby the surface presents a pebbled and wrinkled appearance and consists of an unbroken extent of rubber, as clearly seen in the plan view of Fig. 3.

In the present embodiment there is seen in Fig. 4 the rubber matrix 13 with the plurality of leather scraps 14b distributively incorporated therethroughout. As clearly seen in the figure, none of these leather pieces is exposed at the surface of the material, the same comprising an unbroken extent of the rubber compound as indicated at 15 and 16. It is found, after the composite material is prepared and vulcanized, as presently to be described, that each face of the material presents the general appearance as illustrated in Fig. 3, which shows a fragment of the rubber face 15 of the material seen in Fig. 4. To draw a rather homely analogy, the surface 15 of the material presents somewhat the appearance of the well-known peanut brittle. There are relatively large protuberances 17 caused by the underlying scraps of leather and the differential shrinking as between the leather and rubber components during the vulcanizing process. Moreover the entire rubber surface 15 is rather uniformly wrinkled throughout as indicated by the shading in Fig. 3 and by the reference character 18 in Fig. 4. The combination of the protuberances 17 and the wrinkling effect of the rubber produces an overall appearance which is quite similar to that of the well-known crepe rubber surface. Thus the composite material hereof, with the leather scraps or pieces completely covered at the surface by a film of rubber, may, in many instances, be utilized as a substitute for crepe rubber. The material possesses the pleasing appearance of crepe rubber while, at the same time, it is more economical of manufacture and possesses enhanced wearing qualities.

In making the composite rubber and leather material hereof, according to the preferred mode of manufacture thereof, pieces of scrap leather, or other similar fibrous materal, of any desired size, such as, for example, ordinary commercial chrome leather scraps, are preferably first mixed with a comparatively small amount of rubber to form what is known in the art as a master batch. This master batch of rubber and leather pieces is then thoroughly mixed or masticated with the remainder of the rubber and suitable rubber compounding agents to produce a finished mix of the desired proportions.

As an example of one formula which has been found suitable for producing a material having the desirable characteristics hereinbefore enumerated, the following table may be referred to:

|  | Lbs. | Oz. |
|---|---|---|
| Rubber stock LS#1A | 7 | |
| Chrome tan leather scraps | 7 | |
| Magnesium carbonate | 2 | |
| Zinc carbonate | 2 | |
| Laurex (activator) | | 1 |
| V. G. B. (antioxidant) | | 2 |
| Sulfur | | 3 |
| Master heptene base (activator) | | 8 |

In the initial operation the leather scraps are introduced together with a very small amount of the rubber stock into a mill of the type commonly known in the art as a "cracker" or set of cracking rolls. This mill may conveniently comprise a plain roll, i. e., one having a smooth cylindrical surface, and a corrugated roll, the two running together in the same direction but at slightly different surface speeds. The action of these rolls is to produce a kneading or tearing action on the material as it passes repeatedly therebetween. The effect of this action is to break or tear the leather scraps repeatedly until they are reduced in size to pieces approximately ⅛ to one inch in length, at which point the pieces are so small that they do not present sufficient area to the action of the rolls for further tearing thereby. During this treatment the rubber stock is thoroughly masticated and worked into the surface of the leather particles and into their shredded or torn edges so that they are intimately combined with the rubber stock.

When the master batch has been thoroughly masticated, as just described, the remainder of the rubber and all of the compounding agents, as desired, are added to the master batch and the whole continued to be worked in the cracking rolls until all of the ingredients and components are thoroughly mixed and the leather particles evenly distributed throughout the mass. In some instances it might be desirable, after preparation of the master batch, to remove the same from the cracking rolls and mix with the remainder of the rubber and the compounding agents in the ordinary smooth surfaced working rolls. However, mixing of the entire mass in the cracking rolls assures a more even distribution of the leather particles throughout the mass.

After thorough admixture of the entire mass has been completed, the material is passed through calendar rolls spaced apart a distance to form a sheet of the thickness ultimately desired in the finished product, in the same general manner as ordinary rubber compound is sheeted out by calendering. The material thus formed can then be vulcanized by supporting it on a tray or other support and placing the same in a vulcanizing oven and subjecting it to vulcanizing heat in a well-known manner. Or, for substantially continuous operation where large production is desired, the sheeted material can be passed directly from the calender rolls onto a traveling belt which passes through a vulcanizing oven or chamber, the material during its travel through the chamber being subjected to vulcanizing temperatures. The resulting product is a sheeted material as hereinbefore described in detail and illustrated in the drawings, at this stage the surface of the material presenting the appearance as shown in Figs. 3 and 4, namely an undulating crinkled surface simulative of crepe rubber. The material can be conveniently utilized for any suitable purpose in this form without further processing.

Figure 2:
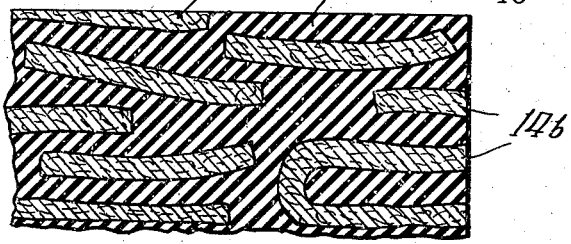
Fig. 2 is a fragmentary cross-sectional view, greatly enlarged, of the soling material of Fig. 1, taken substantially on the line 2—2 of Fig. 1.

Generally, however, for use as shoe soling material it is desired to have pieces or surfaces of the leather exposed on at least one face of the material, as in the preferred form of the invention illustrated in Figs. 1 and 2. To achieve this condition, the material, after vulcanization, may be subjected to a buffing or grinding operation by means of a suitable rotating abrasive device. By buffing or abrading a surface of the material the outer film of rubber is removed from particles of leather which are close to the surface, as indicated at 14a in Fig. 2. At the same time the leather is somewhat roughened. After this buffing operation the treated surface of the material presents the appearance seen in Fig. 1 wherein numerous pieces of leather are exposed throughout the entire surface extent of the material.

While it is generally preferable to produce the material as just described, thereby providing the material in vulcanized sheet form from which suitable shapes such as shoe soles and heels may be cut, it may sometimes be desirable to utilize the material in an assembly before vulcanization. Thus, in the manufacture of shoes which are themselves to be subjected to a complete vulcanization treatment, the composite material as it comes from the cracking or mixing rolls, and previous to vulcanization, may be blanked out to a desired shape, such as a shoe sole. The thus formed sole may then be incorporated in a shoe in the same manner as is the ordinary rubber soling material and the entire shoe thereafter subjected to a conventional vulcanizing treatment. Obviously such treatment is effective to cure the composite material in the same manner as the ordinary rubber sole is cured. Thereafter the bottom surface of the sole may be suitably buffed or abraded to expose the leather pieces, as previously described, or the buffing treatment may be omitted leaving to the shoe sole bottom the characteristic appearance of crepe rubber.

In either event the novel composite material hereof provides a substance which partakes of the characteristics and advantages of both rubber and leather, which is pleasing in appearance, has desirable wearing qualities, and is simple and economical of manufacture.

It is to be understood that wherever, in the specification and claims, the term "rubber" is used, this term is intended to include, in addition to natural rubber, any of the synthetic rubbers, such as the polymers and co-polymers of various hydrocarbons, or similar substances, or any thermoplastic material capable of forming a flexible, resilient matrix for the fibrous scraps, and of being sheeted out to desired sizes and shapes.

While I have described my invention in a preferred form, I am aware that various changes and modifications may be made without departing from the principles of my invention, the scope of which is to be determined by the appended claims.

What is claimed is:

1. The method of making a composite material which comprises, milling together scraps of leather of substantial extent and rubber stock in a cracking mill whereby the said scraps are torn and reduced in size to lengths varying from about ⅛ inch to not greatly in excess of one inch and also distributively admixed with the rubber to form a master batch, milling the master batch together with additional rubber stock and rubber compounding agents, sheeting out the milled product, and vulcanizing the same.

2. The method according to claim 1 and including the additional step of abrading at least one surface of the vulcanized product to expose some of said leather pieces for providing scattered but substantial areas of leather at said surface.

CLAUDE DODDS MASON.